United States Patent

[11] 3,608,935

| [72] | Inventor | Edward W. Hodapp, Jr.<br>Gardena, Calif. |
|---|---|---|
| [21] | Appl. No. | 6,631 |
| [22] | Filed | Jan. 28, 1970 |
| [45] | Patented | Sept. 28, 1971 |
| [73] | Assignee | Hughes Aircraft Company<br>Culver City, Calif. |

[54] HELMET MOUNTED DISPLAY UNIT WITH FASTENER DEVICE
2 Claims, 4 Drawing Figs.

[52] U.S. Cl. .................................................. 287/23, 287/119
[51] Int. Cl. .................................................. F16d 1/10
[50] Field of Search .......................... 287/23, 103 R, 119 R; 24/230 AS, 230 F, 230 R, 211 P, 211 R

[56] References Cited
UNITED STATES PATENTS

| 1,425,618 | 8/1922 | Vodicka ....................... | 24/211 P |
| 2,499,712 | 3/1950 | Armstrong ................... | 287/103 R |
| 2,942,903 | 6/1960 | Giladett ....................... | 287/119 R |

*Primary Examiner*—David J. Williamowsky
*Assistant Examiner*—Andrew V. Kundrat
*Attorneys*—William H. MacAllister, Jr. and Paul M. Coble ABSTRACT: Helmet-mounted, electro-optical display unit with fastener device for mounting and demounting of the display unit. Special design of the fastener device allows simple, quick operation thereof by the human hand to effect detachment of the unit from the helmet.

PATENTED SEP 28 1971

INVENTOR.
EDWARD W. HODAPP, JR.,
BY Andrew M Lesniak

ATTORNEY.

HELMET MOUNTED DISPLAY UNIT WITH FASTENER DEVICE

The invention described herein was made in the performance of work under Air Force Contract.

The present invention relates to helmet-mounted, electro-optical display systems or units and specifically to fastener devices employed therein and affording a convenient means for attaching the display unit to the helmet or other headwear in a way which facilitates subsequent detachment thereof.

The invention relates in particular to parts of a helmet-mounted display unit that incorporates a miniaturized, cathode-ray tube, an optical arrangement including mirrors, and other parts for presenting visual data, such as a television-type picture, directly to the eye of the person wearing the helmet.

Growing military interest, in particular, in the convenient display of visual data in already crowded, overcluttered airplane cockpits where space and weight are at a premium has led to the development of lightweight, compact, electro-optical display units, of the type involved in the present invention, which can be worn on a pilot's helmet for use in presenting visual data such as a television picture directly to the human eye. Related weaponry applications have further stimulated such development work.

The invention finds use in various systems having both military and nonmilitary application wherein presentation of visual data from an electro-optical system is desired to be accomplished in a direct manner.

Systems of the type to which the present invention pertains are of especial interest in military applications and, in general, in order to be acceptable to the user, as for example the pilot of a military or civilian aircraft, should be both lightweight and noncumbersome.

Among the objects of the present invention it is an object to provide a novel fastener device for use in a helmet-mounted electro-optical display system. Pursuant to this object, the fastener device is designed to be failproof in operation.

Another object is to provide a helmet-mounted system which can be readily and conveniently detached from a helmet.

Yet another object is to provide both a portable, lightweight electro-optical unit and a means employed therewith for mounting such unit on a helmet or similar headgear.

The invention and its further objects, features, and advantages will be understood more clearly and fully from the following detailed description of the accompanying figures wherein:

FIG. 3 is a sectional view, taken along line 3—3 in FIG. 1, of the earlier mentioned fastener device and related parts of the present invention, while

Figure 1:
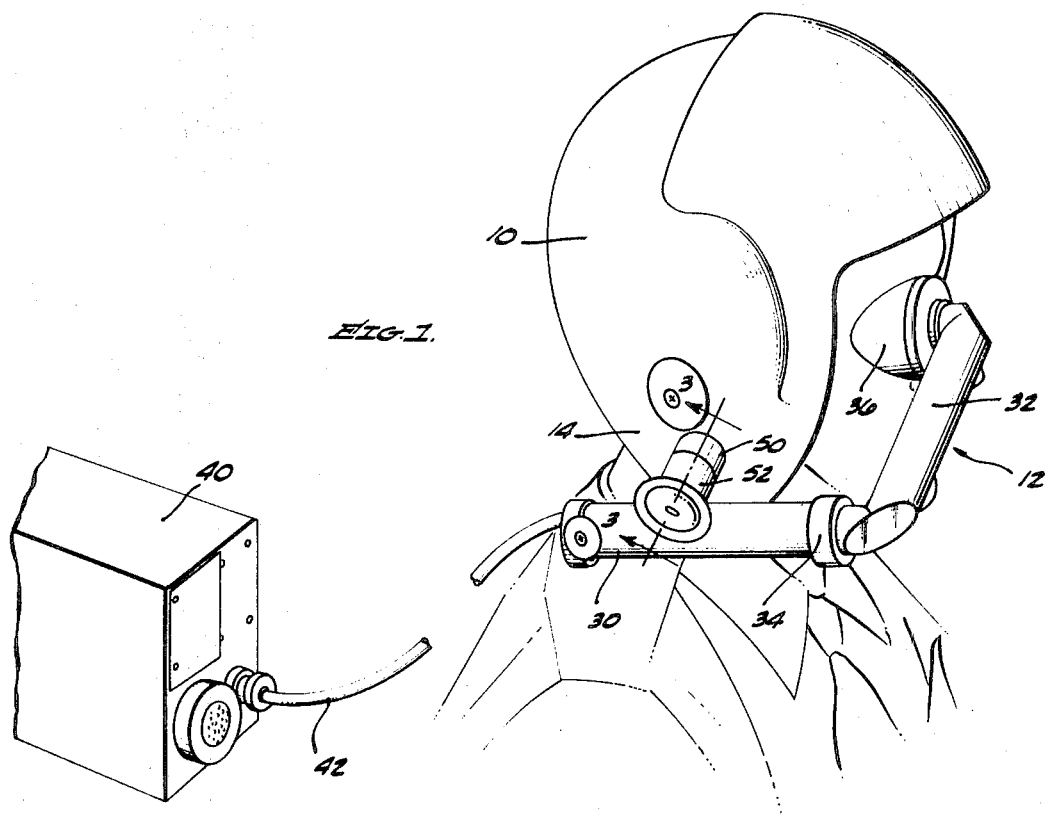
FIG. 1 shows the electro-optical display unit mounted on a helmet.
Figure 2:
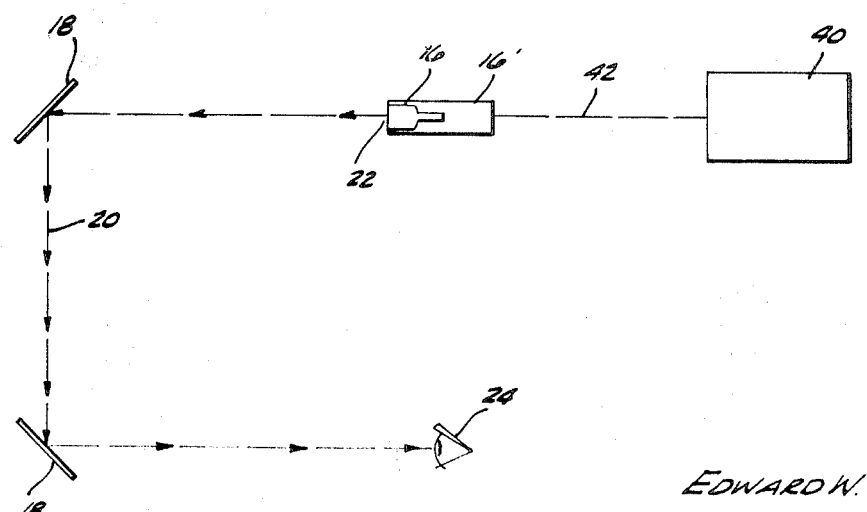
FIG. 2 shows generally the components of a somewhat more complete system including the display system or unit involved in the present invention.

Referring now to the various figures, in FIG. 1 there is shown a helmet 10 worn by a person, such as an aircraft pilot, from which a portable, lightweight, nonbulky, electro-optical display unit 12 is suspended, by means of a fastener device 14, for purposes to e described. The fastener device 14 is mounted lowermost at one side of the helmet 10 to reduce strain on the spinal column of the helmet wearer when the electro-optical display unit 12 is worn on or suspended from the helmet for any appreciable length of time or under special gravity situations as might be due to acceleration and deceleration. The unit 12 generally comprises, as depicted in FIG. 2, a cathode-ray tube 16, a pair of reflecting mirrors 18 by which visual data (indicated by the beam 20) such as a television-type picture may be directed from the picture screen 22 of the tube to the eye 24 of the helmet wearer. These, and associated parts such as magnifying lenses (not shown) and so forth are contained in two separate tubular sections of the unit 12 as depicted in FIG. 1. The display unit's two separate tubular sections 30 and 32 are assembled together in the relation shown in FIG. 1 by a mechanical connection including a mechanical locking ring 34 which is rotatable to lock or unlock the sections. The tubular section 32 has an eyecup 36, rotatable with respect thereto, fitted about the right eye of the helmet wearer while the tubular section 30 is suspended from the fastener device 14. The eyecup 36 covers the right (or left, as the case may be) eye blocking out light other than what is projected onto the covered eye by the cathode-ray tube in the display unit.

The eyecup 36 overlies and covers one eye at the time the display unit is in active use. Since the covered eye is thus isolated it is possible for each eye of the user to adapt to different light levels. The eyecup 36, provided to fit comfortably in place over the eye, helps to hold the display unit still relative to the eye for the purpose of reducing eye strain which may be suffered by the user.

The reflecting mirrors 18 within the tubular assembly 30, 32 are arranged generally at a right angle to each other and serve to reflect and direct visual data from the screen of the cathode-ray tube 16 in the tubular sections 30 to the user's eye 24.

Generally, the cathode-ray tube 16 is operatively coupled in circuit connection with a portable electronic input unit 40 by means including a length of flexible cable 42 passing rearwardly from the rear end of the unit 12 down over the shoulder of the person wearing the helmet 10 to the input unit 40 with the cable or cord 42 and terminating thereat in an electrical connector which circuit connects the two parts. The cable 42 contains electric conductors serving to operatively connect the input unit 40 and a cathode-ray tube assembly 16' which includes suitable circuits operated by and in conjunction with the input unit 40 to convert visual data in electronic form from the input unit 40 into visual data in the form of an image on the screen of the cathode-ray tube 16 which is projected, as indicated by the beam 20, for viewing by the human eye 24.

The electro-optical display unit 12 is detachably secured, attached to, or suspended from the helmet 10 by the fastener device 14 situated at one side of the helmet on its lower part. The fastener device is specially designed to allow for quick detachment of the display unit 12 from the helmet 10 should the need arise as might occur, for instance, in an emergency.

Figure 3:
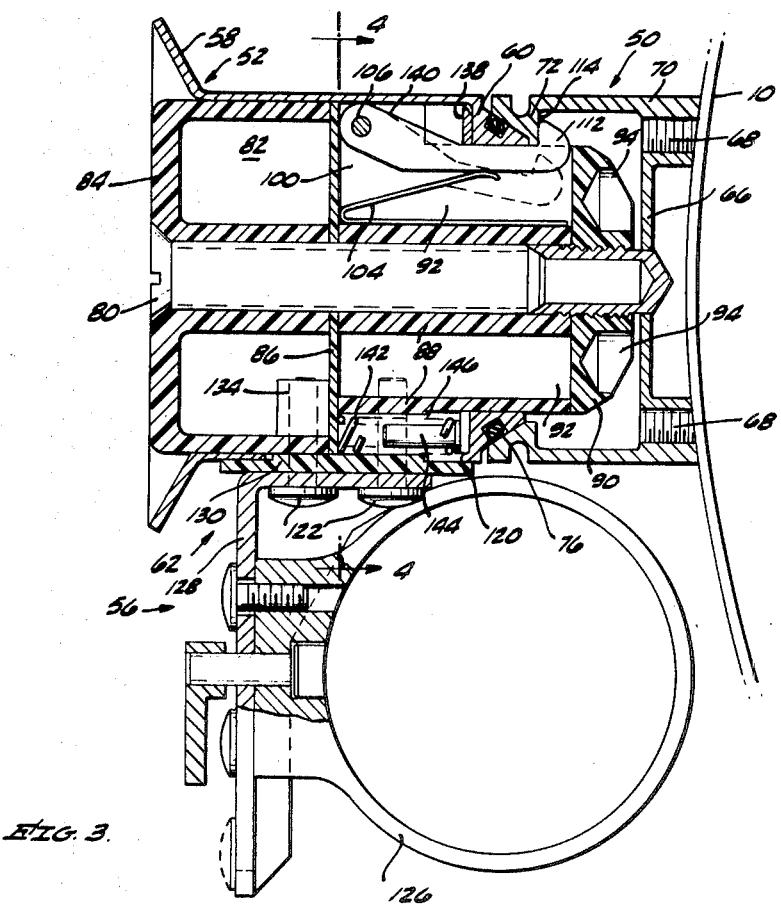
Figure 4:
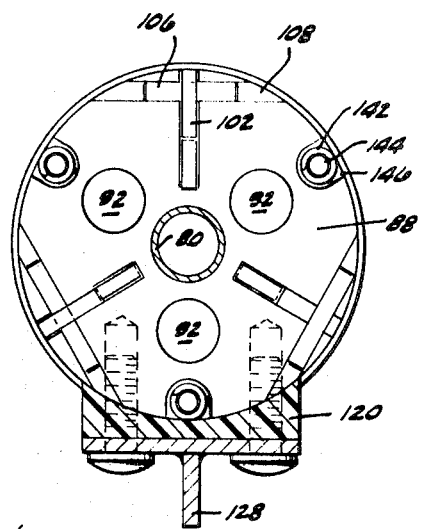
FIG. 4 is a sectional view taken along line 4—4 of FIG. 3.

Referring now to FIGS. 3 and 4, the fastener device 14 includes a helmet-mounted-fastener member 50 and a fastener member 52, which is joined thereto and from which the unit 12 is suspended, by the means of an assembly 56.

The fastener member 52 is a cylindrical tube or sleeve, of metal, including a circular flange 58, a conical lip 60 and an opening on its periphery indicated by numeral 62. The latter part or opening 62 allows the display unit 12 to be supported therefrom by the assembly 56 in a manner to be described later.

The member 50 of metal to which the member 52 is fitted and joined includes a base part 66 including threaded holes 68 secured to the helmet 10 by threaded bolts (not shown) threaded into the holes 68 and into the helmet 10 in a conventional fashion. The latter fastener member 50 also includes a cylindrical tube 70 or sleeve having a conical lip 72 which is complementary to the lip 60 and in which the lip 60 is seated when both members 50 and 52 are fitted together. Between the conical lips, a rubber grommet 76, situated on a circular groove in the lip 60, serves to constrain rotation of member 52 relative to member 50 when the two are joined by virtue of friction and compression forces between the grommet and the lips.

The member 52 contains a number of plastic pieces or parts that are mounted therein in such a way as to form in conjunction with a generally hollow threaded post 80 a movable unit indicated by numeral 82 which may be otherwise also designated as a support body, body structure, or the like and which structure 82 is able to be moved axially, as a single unit, or assembly, relative to the fastener member 52 in the course of attaching and detaching the same to and from the fastener member 50. The pieced include an outer button or member 84, shown as being in the form of a hollow annular drum having one side of the drum removed so as to have a generally U-shaped cross-sectional configuration; an annular disc 86 with a hole through its center; an annular pedestal 88; and an annular base 90.

The plastic parts or members 84, 86, 88, and 90 are coaxially, adjacently mounted about the center post 80 with a conical head of the post serving to hold the button 84, disc 86, and pedestal 88 on the post 80 between the head of the post and the base 90 which is threaded onto the foot (or rightmost end) of the post to thereby capture the various parts on the post 80. Weight is saved by various weight-saving holes 92 and 94 drilled in the pedestal and base respectively.

The pedestal 88 resembles two right cylindrical sections, of differing diameter, that are joined axially with the narrow section being rightmost or closest the helmet 10 in FIG. 3. Three equispaced, axially oriented slots or recesses 100 formed in the periphery of the pedestal 88 are each designed to accommodate therein a respective latch member 102 and an associated latch spring 104. Each latch member 102 is pivoted in the center of a respective latch pin 106 resting in a respective chordal slot 108 which is of a transverse width slightly larger than the diameter of the pin, is formed in the pedestal 88 on its left end, extends down into the left end a slight distance, and intersects the periphery of the left end on each side of the pivot plane of the associated latch member. Each latch member 102 includes a hooked end 112 that is caught axially on a radial surface 114 of the conical lip 72 when both fastener members are joined thus preventing unintentional axial separation of such members by holding the same together yet permitting relative rotation therebetween to be affected for fitting the display unit 12 comfortably in place with the eyecup 36 fitted about the eye of the helmet wearer.

In order to keep the latch members 102 latched or hooked on the radial surface 114 during normal use of the fastener device 14, the spring member 104, generally of V-shaped configuration, is disposed within each recess or slot 100. The spring members 104 are each fitted into the respective slot 100, which is slightly wider, with the spring member 104 disposed radially inward or beneath a respective latch member 102 with the bight portion between the legs of the V being closest the disc 86. One leg of each spring member 104 is seated on the floor or base of the associated slot 100 and extends substantially the entire axial length of the slot while the other leg of the spring member resiliently abuts the inside edge or face of the latch member 102 to exert spring force thereagainst acting to urge the associated latch member radially outward about its pivot pin to thereby hold the latch member in the latched position (shown in solid lines).

In order to support the display unit 12 on the helmet 10 the fastener device 14 is further provided with a plastic spacer member 120 through which threaded bolts such as 122 pass in order to secure the assembly 56 carrying the display unit 12 to the fastener member 52. The assembly 56 cannot be seen in the view shown in FIG. 1 but a part thereof can be seen in FIGS. 3 and 4 wherein the tubular sections 30 and 32 of the display unit and the cathode-ray tube 16 are deleted and wherein a frontmost one 126 of a coaxial pair of mounting clamp rings of a clamping arrangement for mounting the tubular display unit 12 therein is depicted. Each ring 126 encircles the tubular section 30 and supports the display unit 12 in proper relation to the helmet as depicted in FIG. 1. The clamp rings 126 are each in turn supported from a bracket member 128 which is supported from the fastener device 14 by virtue of its securement thereto via the spacer member 120.

In order to support the bracket member as aforesaid and yet achieve desired operability of the fastener device 14 the aforementioned opening 62 in the fastener member 52 is made rectangular and of larger size than the space member 120 which is also generally rectangular, and which is disposed in registry with the opening 62. The spacer member 120 has an upraised section 130 defining a concave surface seated on the periphery of the button 84 and pedestal 88.

A plastic part 134, having a spherical side and threaded holes receiving the bolts 122, is disposed in the annular space inside the button 84 to reinforce and strengthen the mechanical connection between the bracket 128, spacer member 120, and body structure 82. The spacer member 120 is of a size and shape relative to the opening 62 such that the body unit 82 to which the spacer member 120 is attached is free to travel in the opening 62 in a direction parallel to the axis of the fastener device to an extent necessary to permit detachment of the fastener member 52 from the fastener member 50. Detachment may be accomplished by the camming of the respective latch members 102 radially inwardly about their respective latch pins by the hard metal thrust ring 138 upon shifting of the support body axially from left to right in FIG. 3 relative to the fastener member 52. Wen this is done, as by pushing the button 84, the radially outermost edge or side of the respective latch members 102 are shifted axially whereupon the thrust ring 138 deflects the outermost edge 140 of each of the moving latch members to move the latch members toward the dotted position shown relative to the respective pivot axes of the respective pivot pins 106.

Normally, the movable unit 82 is disposed with the foot of the post 80 seated in a central opening in the base part 66 of the fastener member 50. Three different pairs of tension springs 142 and centering bolts 144 disposed peripheral openings 146 in the pedestal 88 bias the movable unit in the axial direction of the fastener device 14 away from the helmet 10. Due to the reduced diameter of the pedestal 88 at its rightmost end the bolts 144 can be and are seated on the radial surface of the thrust ring 138.

The electro-optical display unit 12 described is mounted on the helmet 10 in a way that includes mechanical features, not shown, adding a certain degree of flexibility of application. Thus, for example, the tubular sections 30, 32 of the display unit can be assembled in either of two relative angular positions in accordance with which side of the helmet the unit is to be attached. The eyecup 36 is arranged to be rotatable with respect to the eyepiece to further facilitate use of the unit from either side of the helmet while the tubular section 30, containing the cathode-ray tube 16, is rotatable within the pair of clamp rings 126 in which it is supported so that regardless of which side of the helmet the unit is to be suspended the cathode-ray tube may be disposed right side up beneath the fastener device 14.

When it is desired to detach the display unit 12 from the helmet 10 the flange 58 on the fastener member 52 is simply encircled by the fingers of the right hand to grip the member while the right thumb is pressed against the outside face of the button 84 toward the helmet 10 to release the member 52 from the member 50 by the attendant actuation of the latch members 102 by the previously described camming action.

What is claimed is:

1. In a coupling device, the combination comprising:
   a pair of coupling members comprising first and second tubular sleeve members detachably joined end-to-end in axial alignment and each including a circular lip which abuts the circular lip of the other member when said pair of members are joined;
   a manually translatable body structure slidably mounted within one of said sleeve members as to be axially movable with respect thereto between first and second axial positions when said body structure is actuated,
   resilient means disposed within said one sleeve member and acting on said body structure to urge it axially away from the other of said sleeve members to said first axial position;
   pivoted latch means carried by said body structure and being arranged for latching engagement with a face of said circular lip of said other sleeve member to latch said one sleeve member to said other sleeve member when said body structure is in said first axial position;

resilient means carried by said body structure for urging said latch means into latching engagement with said face of said circular lip of said other sleeve member when said pair of members are joined; and a cam face associated with said one sleeve member and located adjacent said latch means so that axial movement of said body structure from said first to said second position will cause said latch means to move axially with said body structure relative to said cam face whereby said cam face acts upon said latch means against the force exerted upon said latch means by the last mentioned resilient means to pivot said latch means out of latching engagement as aforesaid to thereby unlatch said pair of members for unjoining the same.

2. The combination comprising:

a first cylindrical sleeve member having a first circular, conical lip at its back end, a second cylindrical sleeve member having a second circular, conical lip at its front end and a base at its rear end;

first and second members being in axial relation with said first and second lips abutting one another and being rotatable relative to one another with said first and second members defining a cavity;

a support hub centrally disposed within said cavity, said support hub having a back end and being mounted within said first member so as to be capable of limited axial movement in opposite directions with respect thereto;

centering means comprised by said base and said back end of said support hub arranged to cooperate with said lips of said members to facilitate axial alignmnet of said member;

said support hub including a front, outer face disposed within the front end of said first member and accessible therethrough;

said support hub including circumaxial recesses each having a respective latch disposed therein that is pivoted for rotation in a radial plane about an axis near the front end of the support hub and that extends backwardly into the second circular lip of said second member;

each latch including a hook at its distal end in hooked engagement with a back face of said second lip;

spring means for urging each latch outwardly of its reces;

spring means arranged within said first member for urging said support hub axially forwardly with respect to the said first member;

surface means arranged within said first member to urge each latch inwardly of its recess about its pivot axis when said outer face of said support hub is pushed axially rearwardly with respect to said first member to thus cam the radially outermost edges of said latches to pivot said latches inwardly into said recesses and thereby disengage said hooks from said back face of said second lip.